United States Patent [19]

Mondt et al.

[11] 4,357,455

[45] Nov. 2, 1982

[54] PROCESS FOR THE PREPARATION OF COPOLYMERS CONTAINING HYDROXYL GROUPS AND THE USE THEREOF

[75] Inventors: Josef Mondt, Königstein; Helmut Rinno, Hofheim am Taunus, both of Fed. Rep. of Germany

[73] Assignee: Hoechst Aktiengesellschaft, Frankfurt am Main, Fed. Rep. of Germany

[21] Appl. No.: 265,793

[22] Filed: May 21, 1981

[30] Foreign Application Priority Data

May 24, 1980 [DE] Fed. Rep. of Germany ........ 3019959

[51] Int. Cl.$^3$ .................... C08G 18/62; C08F 8/14; C08F 220/28; C08F 246/00
[52] U.S. Cl. ........................ 528/73; 525/119; 525/384; 525/330.1; 528/75; 528/103; 528/361; 528/366; 525/328.8
[58] Field of Search ............... 528/73, 75, 361, 366, 528/103; 525/329, 384, 119

[56] References Cited

U.S. PATENT DOCUMENTS

| | | | |
|---|---|---|---|
| 3,002,959 | 10/1961 | Hicks | 528/366 X |
| 3,116,270 | 12/1963 | Pennino | 525/384 X |
| 3,250,734 | 5/1966 | Sekmakas | 525/384 X |
| 3,514,419 | 5/1970 | Darlow et al. | 528/366 X |

FOREIGN PATENT DOCUMENTS 2039498 8/1980 United Kingdom ................ 528/366

Primary Examiner—Earl A. Nielsen
Attorney, Agent, or Firm—Hammond & Littell, Weissenberger and Muserlian

[57] ABSTRACT

Process for preparing copolymers soluble in organic solvents and containing hydroxyl groups, by the polymerization and esterification of (a) at least one $\alpha,\beta$-olefinically unsaturated carboxylic acid with (b) at least one olefinically unsaturated copolymerizable monomer and (c) at least one epoxy group-containing compound, at an elevated temperature, in the presence of a polymerization catalyst and, advantageously, a polymerization modifier, characterized in that glycidol,

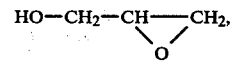

is used as component (c), either alone or in admixture with one or more glycidyl esters with 12 to 19 carbon atoms and derived from saturated fatty acids, the number of epoxy groups being at least equivalent to the number of carboxyl groups, and in mixtures of glycidol with glycidyl esters, the number of equivalents of glycidyl esters is at most twice as great as the number of equivalents of glycidol. The invention further relates to the use of the products obtained for the preparation of air- or oven-drying coating compositions.

11 Claims, No Drawings

PROCESS FOR THE PREPARATION OF COPOLYMERS CONTAINING HYDROXYL GROUPS AND THE USE THEREOF

The preparation of copolymers containing hydroxyl groups is described in detail in the literature. These products are widely used as binders for stoving coatings. Three different reaction methods may be used to prepare these copolymers.

The method most frequently described is the copolymerisation of unsaturated monomers, such as acrylates, methacrylates and vinyl compounds, with unsaturated monomers having a hydroxyl group, e.g. 2-hydroxyethyl acrylate. Copolymers are also known which contain glycidyl groups as side groups, e.g. those prepared by the copolymerisation of the above-mentioned monomers with glycidyl methacrylate. After polymerisation, the glycidyl groups in the copolymer may yield polymers containing hydroxyl groups by a polymerisation-like reaction with acidic hydrogen-containing compounds, involving an addition reaction.

The third method involves the use of a copolymer which contains carboxyl groups, e.g. prepared from the copolymerisation of the above-mentioned monomers with acrylic acid, methacrylic acid or maleic acid. An esterification reaction with epoxides will then also yield copolymers containing hydroxyl groups.

The copolymers containing carboxyl groups may be reacted with epoxides by two different methods, namely 1. a polymerisation-like reaction of the acid group-containing copolymers with epoxides after the polymerisation, or
2. a reaction in situ, wherein the polymerisation and esterification occur simultaneously in the reaction mixture. In addition to any polymerisation catalyst, an esterification catalyst may also be present at the same time (cf. German Pat. No. 1,038,754, German OLS No. 1,520,610), to ensure that esterification is also completed parallel to the polymerisation. In an alternative of the reaction in situ, the esterification is carried out without a catalyst (German Patent No. 1 520 688 and German ALS No. 2 603 259). According to these publications, glycidyl esters of general formula

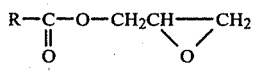

are particularly suitable for esterification in situ without a catalyst, and unlike the aliphatic monoepoxides, e.g. propylene oxide, they result in virtually quantitative conversions within the usual reaction times, even without esterification catalysts. The glycidyl ester of versatic acid is used particularly frequently (German ALS No. 2,603,259).

The object of the present invention is to prepare copolymers containing hydroxyl groups, by producing hydroxyl groups in situ during or after the copolymerisation and without using an esterification catalyst.

The invention therefore provides a process for preparing copolymers soluble in organic solvents and containing hydroxyl groups, by polymerisation and esterification of (a) at least one α,β-olefinically unsaturated carboxylic acid with (b) at least one olefinically unsaturated copolymerisable monomer and (c) at least one epoxy group-containing compound, in the presence of a polymerisation catalyst and advantageously a polymerisation modifier and preferably without any esterification catalyst, whilst heating to +150° C., which is characterised in that component (c) is glycidol,

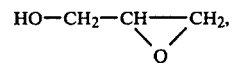

either alone or in admixture with one or more glycidyl esters containing from 12 to 19 carbon atoms and derived from saturated fatty acids, the number of epoxy groups being at least equivalent to the number of carboxyl groups and in mixtures of glycidol with glycidyl esters, the number of equivalents of glycidyl esters is at most twice as great as the number of equivalents of glycidol. Glycidol is the simplest chemical compound which contains one epoxide group and one primary alcohol group in the molecule. Glycidol, which is preferably used on its own, or the mixture with the glycidyl ester, is preferably placed in the reaction vessel first or is added to the reaction mixture during the preparation of the copolymers. In the latter case, it is advantageously mixed with the unsaturated monomers in a metering device. In a preferred embodiment, the glycidol is placed in the reaction vessel first dissolved in a solvent, possibly together with other comonomers; then the monomer mixture is metered in at an elevated temperature—generally from 80° to 150° C., preferably between 100° and 140° C. and appropriately together with the polymerisation catalyst and the polymerisation modifier—and the mixture is simultaneously polymerised and esterified.

The process may be carried out in the absence of any solvent. However, it is preferable to work in organic solvents such as aliphatic or aromatic hydrocarbons, esters, ethers and ester-ethers. Toluene, xylene, monoglycol ether acetates or mixtures of these solvents, for example, are particularly preferred.

The particular advantage of esterification in situ with glycidol and without an esterification catalyst is that two hydroxyl groups are introduced into the polymer molecule simultaneously in one addition step. As a result, the same hydroxyl concentration can be obtained with substantially less material, compared with the use of the glycidyl esters described hitherto (e.g. the glycidyl ester of versatic acid). Furthermore, with glycidol it is particularly easy to obtain very high hydroxyl concentrations for the preparation of copolymers with a special range of application (e.g. coatings resistant to poison gas, based on polymer films with an extremely high degree of cross linking).

It is surprising that it should be possible to prepare the copolymers easily and without any problems, whilst esterification occurred simultaneously, since glycidol is described as a reactive compound in the literature and may even react with itself to form polyglycidol or may enter into a plurality of uncontrolled side reactions (Chemiker-Zeitung 1975, 19–25). Moreover, the molecular structure would lead one to expect reaction characteristics corresponding more to the aliphatic monoepoxides, e.g. propylene oxide.

It is also surprising that the esterification with glycidol in situ should be possible without using the known esterification catalysts within the short reaction times described in the patent literature relating to glycidyl esters. These are significantly different from the reaction times with aliphatic monoepoxides, such as ethylene oxide, propylene oxide or butene-2-oxide, with which satisfactory conversions can only be obtained with specifically active esterification catalysts (German Pat. No. 1,038,754). With the process of the invention, the formation of undesirable residues of catalysts in the solutions of the polymers or in the polymers themselves is avoided and the process also prevents any undesirable coloration of the products which would frequently otherwise occur and would make the products unsuitable for use in clear or white coatings, for example, or would restrict them to coloured coatings. Furthermore, any undesirable effect on the distribution of molecular weight in the copolymers by the esterification catalysts is prevented.

The reaction in situ yields polymer solutions which are as clear as water, with an iodine colour number according to DIN 6162 of about 1 and a residual acid number after a conventional reaction time of less than 10.

If esterification catalysts, e.g. those known from the literature (cf. German Pat. No. 1 038 754 and German OLS No. 1 520 610) based on organic or inorganic substances—e.g. Cr(III) salts—are also used, the acid number can be lowered still further, but the copolymer solutions frequently then undergo colour changes; they are then only suitable for the preparation of coloured coatings.

The unsaturated carboxylic acids are generally used in an amount of from 0.5 to 14, preferably from 3 to 13, more particularly from 8 to 12% by weight, based on the solids content of the end product (i.e. not only the monomers but also the glycidol, catalyst and modifier). Examples of acids which may be used include fumaric, itaconic and crotonic acid, but acrylic, methacrylic and maleic acids are preferred. If a dibasic acid is used, it is also possible to use the monoesters, e.g. esters with alkanols having 1 to 12 carbon atoms.

Examples of the unsaturated monomers (b) include esters of acrylic and methacrylic acid with straight-chained or branched monohydric alcohols having 1 to 12 carbon atoms and/or nitriles and acid amides of olefinically unsaturated carboxylic acids. Instead of or together with the acrylic or methacrylic acid derivatives, it is also possible to use conventional vinyl compounds such as styrene, the various vinyl toluenes and vinyl xylenes, vinyl acetate, vinyl propionate and vinyl chloride and/or vinylidene compounds, such as α-chloro- and α-methyl styrene, vinylidene fluoride and vinylidene chloride. Preferred monomers for the preparation of copolymers containing hydroxyl groups according to the invention are styrene, the various vinyl toluenes, methyl, ethyl, n- and iso-propyl, n-, iso-, sec. and tert.-butyl, 2-ethylhexyl and lauryl acrylate and methacrylate.

The preferred glycidyl esters are those of branched fatty acids of general formula

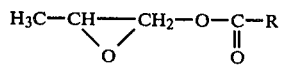

wherein R is a group with 8 to 15, preferably 8 to 12 carbon atoms, derived from a branched fatty acid and has one or two alkyl substituents in the α-position. The glycidol or the mixture with the glycidyl ester is generally used in a slight excess, suitably from 1 to 15, preferably from 3 to 8 equivalent %, based on the carboxyl groups in the starting mixture.

The copolymers obtained according to the invention generally have a hydroxyl group content of 1.5 to 6.5, preferably from 3.5 to 5.0% by weight, based on the solids content in the end product.

For special applications of the copolymers containing hydroxyl groups, in the field of providing surface coatings, it may be advantageous to co-use other compounds containing hydroxyl groups, e.g. hydroxyethyl and hydroxypropyl acrylate or methacrylate, in the copolymerisation. However, the proportion of these compounds is preferably not more than 30% by weight of the solids content of the end product.

Preferably, organic peroxides which have a half-life of from 2 to 5, preferably 3 to 4 hours at a temperature of from 80° to 150° C., are used as the polymerisation catalysts. They are generally added in an amount of from 0.1 to 4% by weight, preferably from 0.5 to 3% by weight of the total monomers. Examples of such catalysts include t-butyl-hydroperoxide, di-t-butylperoxide, t-butylperbenzoate, cumene hydroperoxide and t-butyl-peroctoate.

As molecular weight modifiers, mercaptans are preferably used, generally in an amount of from 0.2 to 3.0% by weight of the total monomer mixture, especially long-chained mercaptans such as lauryl mercaptan.

The copolymer solutions prepared according to the process of the invention generally have solids concentrations of from 50 to 70% by weight. The copolymers or solutions thereof are used as binders for air-drying two-component coating compositions or stove-hardening coating compositions, and, particularly for processing to form stove-hardening coating compositions, they are advantageously mixed with epoxy resins and/or etherified aminoplast resins.

The coatings obtained have unexpected properties, particularly exceptional resistance to weathering and yellowing. Other major advantages are rapid drying at room temperature, and fast through-drying of the coating films applied. Substrates which may be coated include porous or non-porous substrates of all kinds, such as textile products, leathers, plastics and wood. The production of coatings on metal substrates may be particularly emphasised.

In order to produce surface coatings by the two-component process, the copolymer containing hydroxyl groups is reacted with a polyisocyanate, e.g. a diisocyanate, or an epoxy resin or a combination of polyisocyanates and epoxy resins. For example, air-drying coating compositions can be produced by reacting the copolymer with a polyisocyanate or epoxy resin in an amount so that there are 0.5 to 1.5, preferably 0.8 to 1.3 NCO or epoxy groups to one hydroxyl group. The drying of the two-component mixtures at room temperature can be improved by the use of drying catalysts, e.g. dibutyl-tin dilaurate or tertiary amines or mixtures thereof. For use, conventional adjuvants such as flow agents, pigments and dyestuffs may be added to mixtures of solvent-containing copolymer and polyisocyanate or epoxide and these mixtures are then applied to the substrate by spraying, dipping, pouring, brushing or other suitable method and the coating films dried either at elevated temperature in a stoving oven or at room temperature. The method of drying depends on the substrate and the requirements of the particular application. It may also be advantageous to mix together the reactive cross-lining partners of the copolymers, e.g. to mix polyisocyanates and reactive melamine resins together. This expedient frequently has a favourable effect on the gloss and flow of the surface coatings.

The invention will now be illustrated with reference to the following non-limiting Examples, in which T refers to parts by weight and % refers to percent by weight. The solids content was determined according to DIN 53183, the acid number (AN) according to DIN 53402, the iodine colour number according to DIN 6162 and the hydroxyl number (OHN) according to DIN 53783.

EXAMPLES (1) 520 T of (2-ethoxy-ethyl)-acetate (i.e. ethylglycol acetate) are heated to 130° C. in a flask provided with a stirrer, reflux condenser and thermometer, and a mixture of 450 T of styrene, 80 T of acrylic acid, 8 T of di-t-butylperoxide and 5 T of lauryl mercaptan is steadily added thereto over a period of 2 hours. The mixture is then stirred at 140° C. for a further 2 hours. Then, over a period of 2 hours, a solution of 85 T of standard commercial glycidol in 120 T of ethylglycol acetate is added to the polymer solution, with stirring, at 120° C. The resulting mixture is then stirred for a further 3 hours at 135° C. Solids content of product 50%; AN 8; iodine colour number 1.

(2) Example 1 is repeated, but 1.5 T of chromium(III) octoate as esterification catalyst is added to the glycidol solution. The end product is clearly green in colour. Solids content of product 50%; AN 4; iodine colour number 8 to 10.

(3) 520 T of ethylglycol acetate are heated to 130° C., with stirring, in an apparatus as described in Example 1. Over 2 hours, 450 T of methyl methacrylate, 80 T of acrylic acid, 8 T of di-t-butylperoxide and 8 T of lauryl mercaptan are metered in. Then, at 120° C., a solution of 85 T of glycidol (commercial product) in 110 T of ethylglycol acetate is added dropwise and the resulting mixture is stirred for 4 hours at 140° C. Solids content of product 50%; AN 6-7; iodine colour number 1.

(4) Example 2 is repeated except that, after the addition of the glycidol, 5 T of triethylamine are introduced into the reaction mixture. The addition of the catalyst causes the resin solution to change colour. It is therefore only suitable for use in coloured coating compositions. Solids content of product 50%; AN 4; iodine colour number 15.

(5) 250 T of ethylglycol acetate and 50 T of glycidol are heated to 130° C., with stirring, in an apparatus as described in Example 1. Then, over a period of 4 hours, 80 T of styrene, 85 T of 2-ethylhexyl acrylate, 116 T of methyl methacrylate, 110 T of hydroxyethyl acrylate, 45 T of acrylic acid, 12 T of t-butylperbenzoate and 5 T of t-dodecyl mercaptan are metered in. The resulting mixture is then stirred for a further 4 hours at 140° C. The copolymer solution is diluted with 100 T of ethylglycol acetate at 100° C. Solids content of product 60%; AN 7-8; iodine colour number 1-2.

(6) 250 T of ethylglycol acetate and 50 T glycidol are heated to 130° C., with stirring, in an apparatus as described in Example 1. Over a period of 4 hours, 80 T of styrene, 80 T of butyl acrylate, 116 T of methyl methacrylate, 110 T of hydroxyethyl acrylate, 45 T of acrylic acid, 12 T of t-butylhydroperoxide and 5 T of lauryl mercaptan are metered in. The resulting mixture is then stirred for a further 6 hours at 140° C. At 120° C. the reaction solution is diluted with 100 T of ethylglycol acetate. Solids content of product 59%; AN 7; iodine colour number 1-2.

(7) 315 T of ethylglycol acetate and 40 T of glycidol are heated to 135° C., with stirring, in an apparatus as described in Example 1. Over a period of 4 hours, 130 T of styrene, 90 T of methyl methacrylate, 40 T of butyl acrylate, 35 T of acrylic acid, 5 T of t-butylhydroperoxide and 4 T of t-dodecyl mercaptan are metered in. The resulting mixture is then stirred for a further 6 hours at 140° C. Solids content of product 52%; AN 5; iodine colour number 1; glass transition temperature $T_G$ +21° C.

(8) 290 T of ethylglycol acetate and 50 T of glycidol are heated to 130° C., with stirring, in an apparatus as described in Example 1. Over a period of 3 hours, 160 T of styrene, 116 T of methyl methacrylate, 50 T of butyl acrylate, 44 T of acrylic acid, 10 T of di-t-butylperoxide and 8 T of lauryl mercaptan are metered in. The resulting mixture is then stirred for a further 6 hours at 140° C. Solids content of product 60%; AN 7; iodine colour number 1-2; glass transition temperature $T_G$ +31° C.

(9) 300 T of ethylglycol acetate and 50 T of glycidol are heated to 125° C., with stirring, in an apparatus as described in Example 1. Over a period of 4 hours, 140 T of styrene, 140 T of methyl methacrylate, 45 T of acrylic acid, 10 T of di-tert-butylperoxide and 5 T of lauryl mercaptan are metered in. The resulting mixture is then stirred for a further 5 hours at 140° C. Solids content of product 57%; AN 8; OHN 170; iodine colour number 1.

(10) 250 T of ethylglycol acetate, 100 T of xylene and 50 T of glycidol are heated to 130° C. with stirring, in an apparatus as described in Example 1. Over a period of 4 hours, 190 T of styrene, 140 T of methyl methacrylate, 45 T of acrylic acid, 10 T of di-t-butylperoxide and 5 T of lauryl mercaptan are metered in. The resulting mixture is then stirred for a further 5 hours at 140° C. Solids content of product 56%; AN 5; OHN 155; viscosity according to Gardner-Holdt X; iodine colour number 1.

(11) 215 T of xylene, 100 T of ethylglycol acetate and 60 T of glycidol are heated to 130° C., with stirring, in an apparatus as described in Example 1. Over a period of 5 hours, 160 T of styrene, 190 T of methyl methacrylate, 55 T of acrylic acid, 6 T of di-t-butylperoxide and 5 T of lauryl mercaptan are metered in. Then the resulting mixture is stirred for a further 6 hours at 140° C. Solids content of product 60%; AN 4; OHN 178; iodine colour number 1-2.

(12) A white coating composition is prepared from the copolymer containing hydroxyl groups prepared according to Example 6. First of all, the polymer solution is diluted with xylene to give a solids content of 50%. The diluted polymer solution has an outlet viscosity according to DIN 53211 of 211 seconds. The white coating composition consists of 100 T of polymer solution, 70.5 T of titanium dioxide (rutile), 1.5 T of a silicone-based flow-promoting agent, 30 T of butyl acetate, 20 T of xylene and 20 T of a high-boiling mixture of hydrocarbons. This mixture is triturated in a ball mill for 16 hours. It is then mixed with 51 T of a 75% solution of a standard commercial polyfunctional reaction product of 3 mol of hexamethylene diisocyanate with 1 mol of water having an NCO content of about 16%. The white coating composition has a pot life of 15 hours and is sprayed onto glass sheets and sheet steel. The air-dried coating films are after 30 minutes so dry that no dust adheres thereto and have pendulum hardness values according to DIN 53157 of 225 seconds after 10 days' air drying. The results obtained in all the technical tests on the coatings confirm the satisfactory drying and through-drying. The coating films stoved at 80° C. and 120° C. also show very good results in the technical tests on the coatings.

(13) A white coating composition is produced from the acrylate resin containing hydroxyl groups prepared according to Example 9. The mixture consists of 100 T of polymer solution, 68 T of titanium dioxide (rutile), 4 T of thickener paste (a 10% mixture of montmorillonite powder in xylene/methanol in the ratio 1:1), 2 T of a silicone-based flow-promoting agent, 10 T of butyl acetate and 17 T of a high boiling mixture of hydrocarbons. After these components have been mixed in a ball mill, 38 T of the polyisocyanate specified in Example 12 are stirred in. The white coating composition is sprayed onto glass and sheet steel. The air-dried coating films are within 20 minutes so dry that no dust adheres thereto and have pendulum hardness values according to DIN 53157 of 197 seconds after 10 days' air-drying. The coating films stoved at 80° C. and at 120° C. also give excellent test results.

(14) A white coating composition is produced from the copolymer containing hydroxyl groups prepared according to Example 10. 100 T of polymer solution, 58 T of titanium dioxide (rutile), 4 T of the thickener paste mentioned in Example 13, 2 T of silicone-based flow-promoting agent, 10 T of butyl acetate and 17 T of a high boiling mixture of hydrocarbons are triturated in a ball mill. 40 T of the polyisocyanate solution mentioned in Example 12 are also added to the white coating composition. The two-component coating composition is sprayed onto glass and sheet steel. The air-dried lacquer films are within 23 minutes so dry that no dust adheres thereto and have pendulum hardness values according to DIN 53157 of 188 seconds after 10 days' air drying. The coating films stoved at 80° C. and at 120° C. also give good results in the technical tests on the coatings.

(15) White and metallic coating compositions are produced from the polymer containing hydroxyl groups prepared according to Example 11, using epoxy resins as the reactive cross-linking component for the functional copolymers. The air-dried coating films are within 20 minutes so dry that no dust adheres thereto and have pendulum hardness values according to DIN 53157 of 222 seconds after 14 days' air drying. These coating films have a xylene resistance of more than 2 hours; their resistance to 10% sodium hydroxide solution is more than 24 hours. The usual physical and chemical tests on the coating films also give very good results.

(16) 300 T of ethylglycol acetate and 50 T of glycidol are heated to 125° C., with stirring, in an apparatus as described in Example 1. Over a period of 4 hours, 140 T of styrene, 140 T of methyl methacrylate, 45 T of acrylic acid and 12 T of di-t-butylperoxide are added thereto. The resulting mixture is then stirred for a further 5 hours at 140° C. Solids content of product 57%; AN 7; OHN 170; iodine colour member 1-2.

We claim:

1. Process for the manufacture of copolymers soluble in organic solvents and containing hydroxyl groups which comprises polymerizing in the presence of a polymerization catalyst (a) at least one α,β-olefinically unsaturated carboxylic acid as component (a) with (b) at least one olefinically unsaturated copolymerizable monomer as component (b) and esterifying with component (c) at least one epoxy compound selected from the group consisting of glycidol of the formula

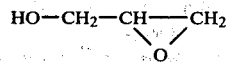

and mixtures thereof with glycidyl esters having from 12 to 19 carbon atoms and being derived from saturated fatty acids in an amount such that the amount of epoxy equivalents contained in the glycidyl esters is at most double as high as that contained in the glycidol, the total amount of the epoxy groups being at least equivalent to those of the carboxyl groups and the polymerization and the esterification being carried out at an elevated temperature in the range from 80° to 150° C.

2. A process as claimed in claim 1 wherein component (c) is present in the reaction mixture already during the polymerization reaction.

3. A process according to claim 1 which is carried out in the absence of an esterification catalyst and in the presence of an organic solvent and a polymerization modifier.

4. A process as claimed in claim 1 wherein the polymerization and the esterification are carried out to yield a copolymer having a content of hydroxyl groups in the range from 1.5 to 6.5 percent referred to the weight of the solids content in the final product.

5. A process as claimed in claim 1 wherein component (b) contains up to 30% by weight of monomers containing hydroxy groups, but otherwise is free from monomers having reactive substituents.

6. A process as claimed in claim 1 wherein 0.5 to 14% of the final product are derived from component (a).

7. A process as claimed in claim 1 wherein glycidol is used as the sole epoxy compound (c) and in an amount of 1 to 15% in excess of the amount equivalent to the carboxyl groups in the starting mixture.

8. A process for the manufacture of copolymers soluble in organic solvents and containing hydroxyl groups as claimed in claim 1 which comprises polymerizing at an elevated temperature in the range from 80° to 150° C. and in the presence of a polymerization catalyst, a polymerization modifier and a solvent (a) at least one α,β-olefinically unsaturated carboxylic acid as component (a) with (b) at least one olefinically unsaturated copolymerizable monomer as component (b) and esterifying with component (c) glycidol of the formula

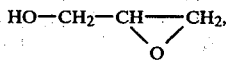

the glycidol being present in the reaction mixture already during the polymerization reaction and in an amount such that the total amount of the epoxy groups is at least equivalent and at most 50% in excess of the amount equivalent to the carboxylic groups in the starting mixture, the polymerization and the esterification being carried out to yield a copolymer having a content of hydroxyl groups in the range from 1.5 to 6.5 percent referred to the weight of the solids content in the final product and 0.5 to 14 percent of the final product being derived from component (a).

9. A coating composition comprising a product obtained according to the process of claim 1.

10. A coating comprising a hardened product prepared by crosslinking the composition according to claim 9.

11. A coating as claimed in claim 10 which has been crosslinked with a compound selected from the group consisting of polyisocyanates and epoxy resins, each applied in an amount such that 0.5 to 1.5 isocyanate or epoxy groups are applied for one hydroxy group of the product of claim 9.

* * * * *